Sept. 2, 1958 F. T. STOTT 2,849,965
MACHINES FOR USE IN THE PRODUCTION OF
COATED TABLETS AND THE LIKE
Filed March 22, 1955 7 Sheets-Sheet 1
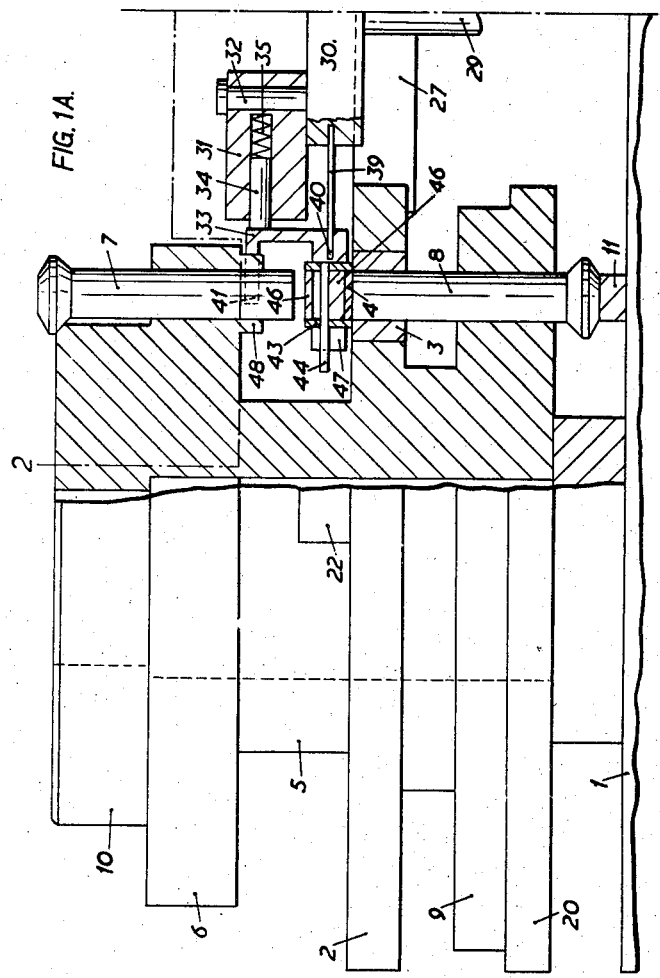
Inventor
*Frank Thomas Stott*
By
Ferdinand Broster Bosshardt
Attorney

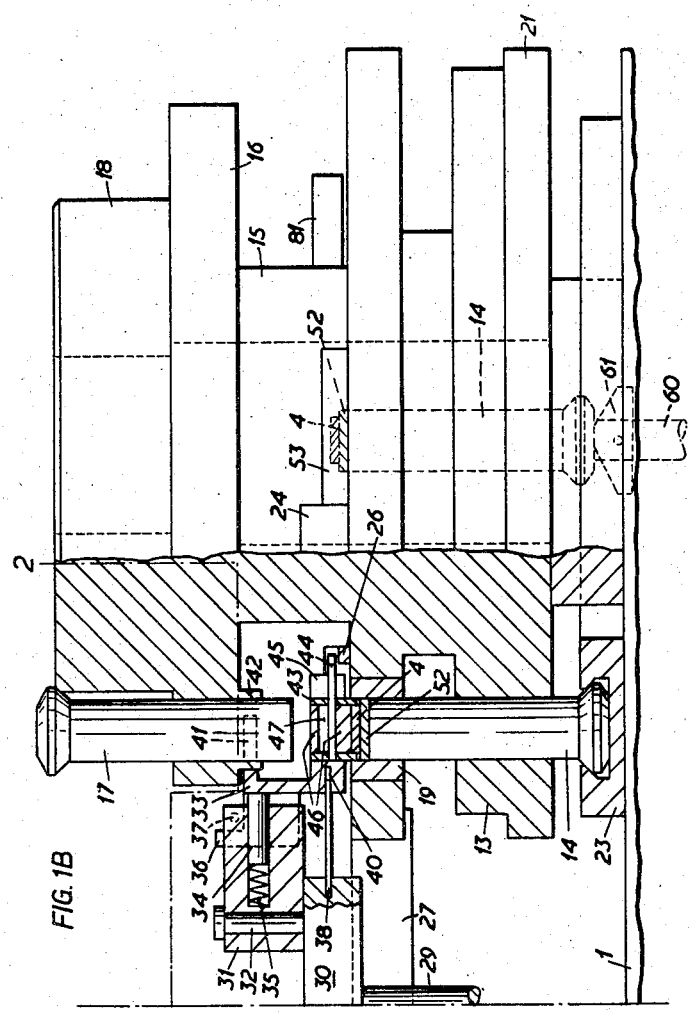

Sept. 2, 1958 F. T. STOTT 2,849,965
MACHINES FOR USE IN THE PRODUCTION OF
COATED TABLETS AND THE LIKE
Filed March 22, 1955 7 Sheets-Sheet 3
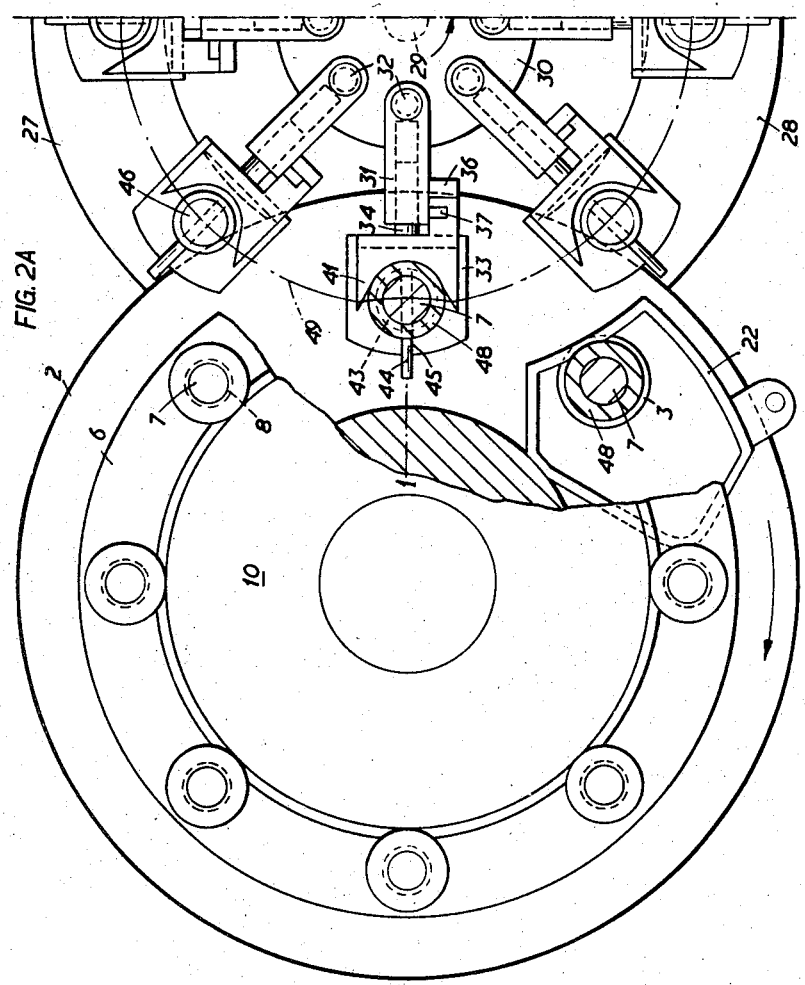
Inventor
Frank Thomas Stott
By
Ferdinand Broster Bosshardt
Attorney

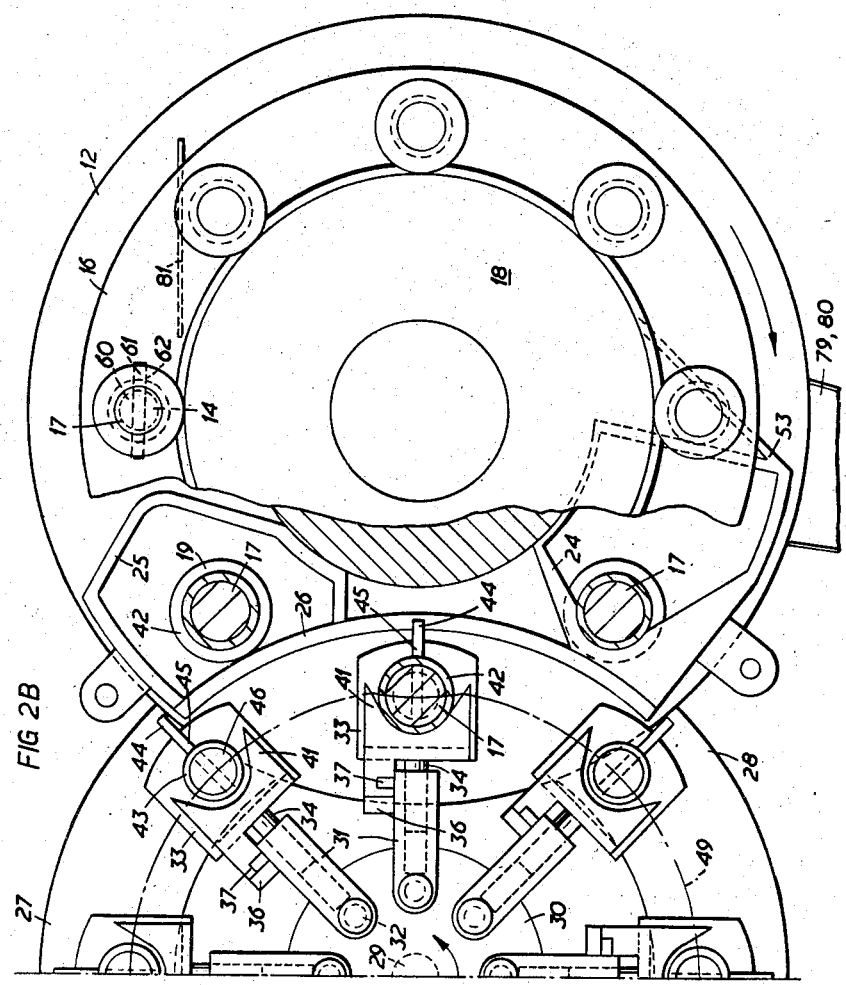

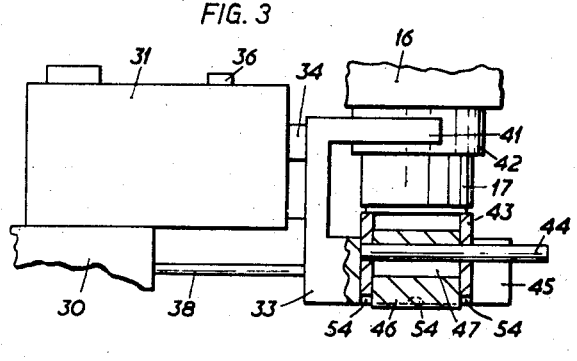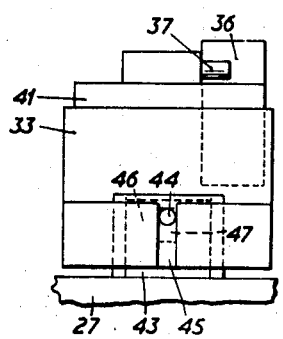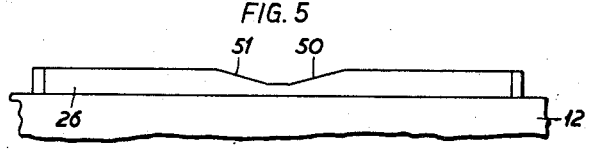

Sept. 2, 1958 F. T. STOTT 2,849,965
MACHINES FOR USE IN THE PRODUCTION OF
COATED TABLETS AND THE LIKE
Filed March 22, 1955 7 Sheets-Sheet 6

Inventor
Frank Thomas Stott
By
Ferdinand Broster Boshardt
Attorney

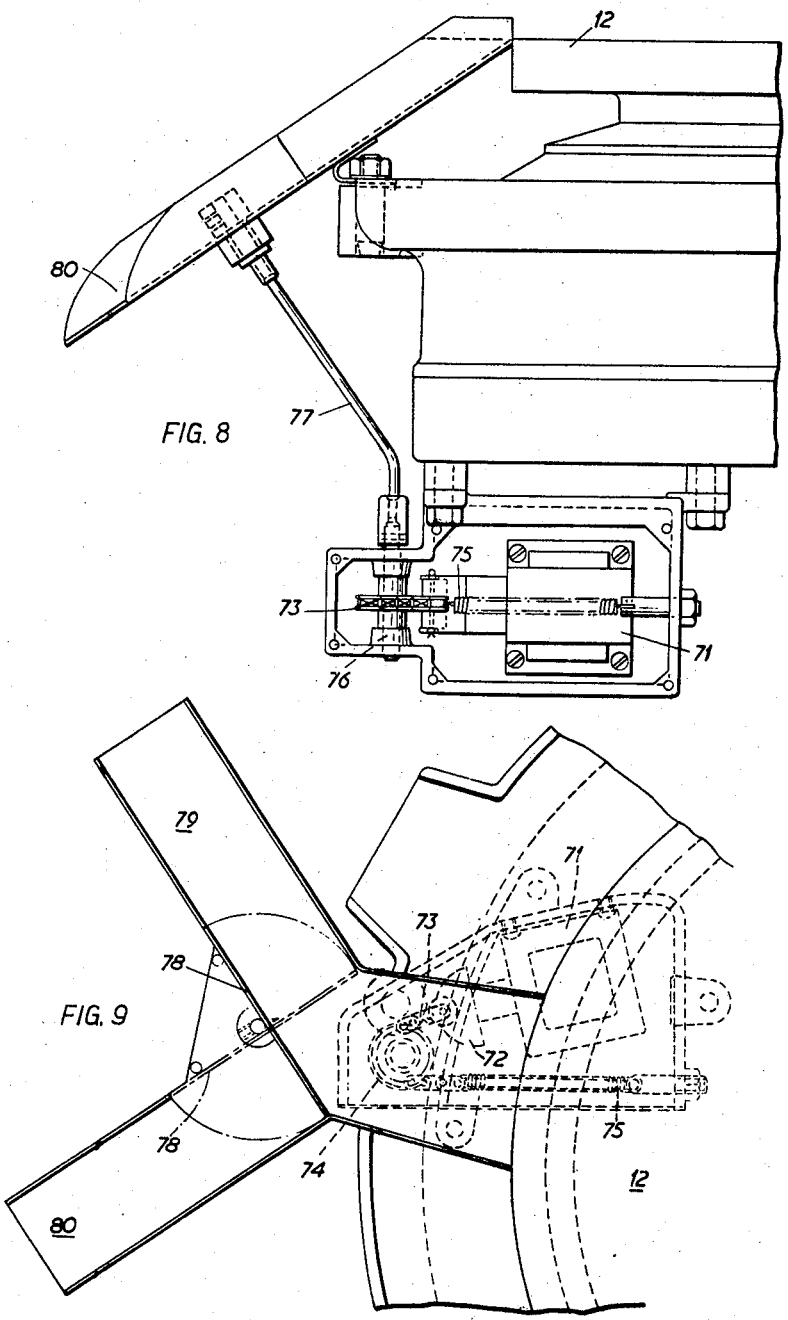

United States Patent Office 2,849,965
Patented Sept. 2, 1958

2,849,965

MACHINES FOR USE IN THE PRODUCTION OF COATED TABLETS AND THE LIKE

Frank Thomas Stott, Rochdale, England, assignor of one-half to John Holroyd & Company Limited, Milnrow, near Rochdale, England Application March 22, 1955, Serial No. 496,010

Claims priority, application Great Britain April 15, 1954

26 Claims. (Cl. 107—1)

This invention relates to machines for the production of coated tablets and the like and has for its main object to provide a novel construction by which it is made possible to obtain a uniform thickness of coat at every part of the coat.

The term "and the like" is intended to include any relatively small articles produced from comminuted powder by pressure and subsequently coated with the aid of pressure and therefore to include coated articles similar to coated tablets but known under other names such as coated pills, coated lozenges, coated charges and so forth.

According to the said invention, a machine for the production of coated tablets or the like comprises a tablet making mechanism for producing a core tablet, a coating mechanism for coating the core tablet and having a coating die, and a transfer mechanism for transferring a core tablet or the like from the core tablet or the like making mechanism to the coating mechanism, the transfer mechanism being positively engaged with and controlled during a restricted period by a part of the coating mechanism which by its action on the transfer mechanism brings and keeps the core tablet or the like truly in phase with the coating die for a period during which the core tablet or the like descends under control into the coating die and the transfer device withdraws from the core tablet or the like and the coating die.

The transfer mechanism is also preferably positively engaged with and controlled during another restricted period by a part of the core tablet or the like producing mechanism which by its action on the transfer mechanism brings and keeps the transfer mechanism truly in phase with the core tablet or the like while being fed to the transfer mechanism.

The transfer mechanism preferably has a telescopic or contractile transfer arm free to yield resiliently from a predetermined basic position on a rotatable support and engageable by a part which is positively connected to the die to travel therewith.

The arm is preferably composed of a portion connected by a pivotal connection to a rotatable support and a second part which is slidable on the first part towards the pivotal connection against a spring load and carries a cavity to contain a core tablet and also has means whereby it can be engaged by a part which rotates with the die, a spring device being provided to retain it resiliently in a basic angular position relative to the rotatable support.

To transfer a core tablet or the like and place it in its proper position in the coating die, the transfer mechanism preferably has a parallel walled cavity in which the core tablet or the like can fit with a close sliding fit and which is provided in a tubular sleeve in which a weight is slidable, the sleeve and weight being raisable by any suitable means, such as a pin and cam, in order to release the core tablet or the like from their action on it after it has been settled by the cavity and weight in the die.

The weight is preferably adapted to be raised after the sleeve in order to use the weight to prevent the core tablet from being lifted out of its settled position by the sleeve and leave the weight free to press on the tablet during the settling period.

The sleeve may have a pin fixed to it for operation by the cam and the said pin may engage an aperture in the weight which permits idle movement of the pin in it and thereby leaves the weight free to descend or delay its ascent independently of the sleeve.

The spring means for resiliently holding the arm in a predetermined angular position relative to the support is preferably a bar or rod spring one end of which is fixed to the support and the other end of which is slidable longitudinally in an aperture in the second part of the arm.

A stop pin is preferably provided on the first part of the arm to co-operate with a shoulder on a portion projecting from the second part of the arm in order to limit the degree to which the second part of the arm can move outwardly under spring load relative to the first part.

A bridge is provided between the core tablet or the like making mechanism and the coating mechanism to form a platform along which the core tablet or the like can be slid in its transfer from the core tablet or the like making mechanism and the coating mechanism.

A bridge or the like may also be provided to retain the said sleeve and weight in a raised position during the return passage of the arm from the coating mechanism to the core tablet or the like making mechanism by forming a support therefor.

Alternatively the said cam may be extended sufficiently to keep the sleeve and weight in the raised position during the return of the arm from the coating mechanism to the core tablet or the like making mechanism.

The transfer mechanism is controlled by a part moving with the coating die so that the core tablet or the like holding portion of the transfer mechanism runs into the circular path of the die and for a period follows the said circular path until the core tablet or the like has been placed and settled in the die while also being positively centralized relative to the die by the said part.

The invention also includes mechanism for enabling a sampling check on the core tablets produced by the tablet making mechanism without stopping the machine, such mechanism preferably including means for causing raising of a formed uncoated core tablet from a coating die in which it is being carried, and means for moving the core tablet from the coating die to a position where it can be collected, the mechanism being adapted to be brought into and out of operation when desired.

The said means for causing raising of a formed uncoated tablet from a coating die may consist of an auxiliary cam associated with a cam which controls the operation of a punch engaging the coating die and on which the core tablet is supported in the coating die, the auxiliary cam being movable into or out of operation as desired.

The said means for moving the core tablet may consist of one or more stationary deflectors adapted to move the core tablet after the latter has been raised and to move it outwardly over a rotating table containing the coating die to the collecting position.

The said deflector or deflectors may cause the core tablet to fall off the table on to a chute leading to a collector.

The said chute may be provided with two branches and means for alternatively opening one branch and closing the other, the said means being brought into operation on operation of the said auxiliary cam, whereby uncoated core tablets raised and deflected down the chute proceed down one branch thereof to a collector and coated core tablets proceed down the other branch to a separate collector.

The said chute branch for collecting uncoated core tablets may be closed and the other branch opened after a time delay following moving of the said auxiliary cam out of operation.

The said operations may be controlled from a single operating lever.

In the accompanying diagrammatic drawings:

Figures 1A, 1B constitute a side view, partly in section on a line corresponding with line 1—1 of Figures 2A, 2B of a machine for producing coated tablets.

Figures 2A, 2B constitute a plan view partly in section of a line corresponding with line 2—2 of Figures 1A, 1B.

Figure 3 is a fragmentary side view, partly in vertical section, of a detail and showing parts in another position.

Figure 4 is a fragmentary end view of a detail and showing parts in still another position.

Figure 5 is an end elevation showing another detail.

Figures 3 and 4 are drawn to an enlarged scale.

Figure 8 is a fragmentary end view of a detail, and

Figure 9 is a plan view thereof.

Figure 6:
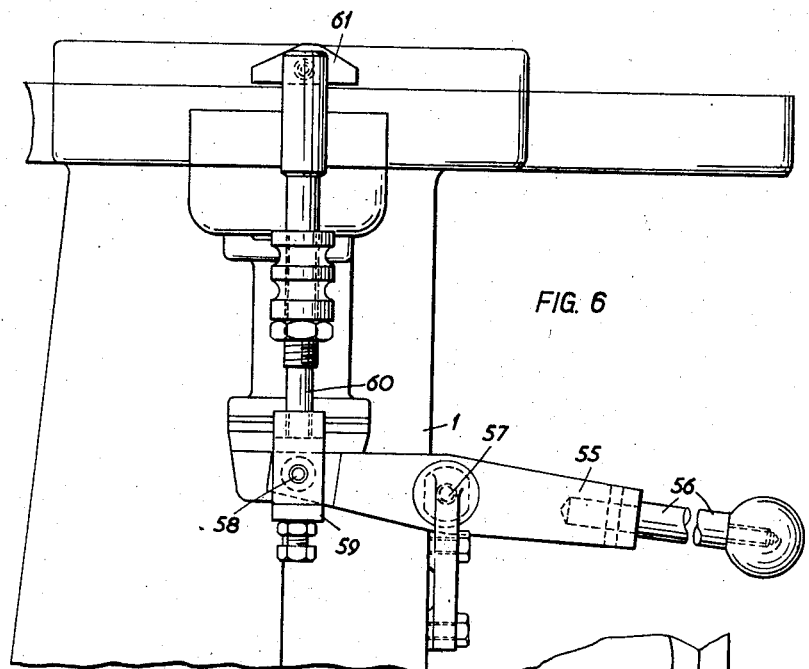
Figure 6 is a fragmentary side elevation of a detail.

Referring to the drawings, there is a stationary base 1 on which a table 2 is rotatably mounted. The table 2 has dies 3 suitable for making core tablets of which two are shown and marked 4. Above the table there is a pillar 5 having a head 6 in which punches 7 are slidable for co-operation with punches 8 slidable in a foot 9 rotating with the table 2. The punches 8 operate in the dies 3 and there is a stationary cam 10 employed to raise and lower the punches 7 which are also acted on by a roller (not shown) serving to force the punches 7 into the dies 3 at the appropriate time in order to compress powder fed by means of a stationary hopper 22 to the dies into core tablets. A stationary cam 11 acts on the punches 8 to raise them sufficiently to force the made core tablets out of the dies. One of the core tablets 4 is shown as just forced out of the die 3. So far the hereinbefore described mechanism is that already wellknown in the manufacture of tablets from powder by pressure.

The base 1 is also provided with a rotatable table 12 having a foot 13 provided with upwardly acting punches 14 and a pillar 15 provided with a head 16 having downwardly operating punches 17 controlled by a cam 18 for the major portion and acted on by a roller (not shown) for a period in order to compress what is inserted into coating dies 19 provided in the table 12. The head 16 rotates with the table 12. The tables 2 and 12 and therefore their feet 9 and 13 and heads 6 and 16 are rotated at equal speeds in the direction of the arrows shown in Figure 2, for example with the aid of a worm wheel 20 connected to the table 2 through its foot 9 and a worm wheel 21 connected to the table 12 through its foot 13. The tables are arranged near each other.

Each punch 14 is controlled by a stationary cam 23 which operates to lower the punch a predetermined amount to enable the die 19 to receive a first charge of powder, then lower the punch to enable the die to receive a core tablet and finally to lower the punch still further to enable the die to receive a second charge of powder. A stationary hopper 24 is provided over the table 12 to supply the first charge to the die and another stationary hopper 25 is provided to supply the second charge to the die. A stationary cam 26 is combined with the two hoppers for a purpose which will be hereinafter described.

The ejected core tablet 4 is introduced into the die 19 between the supply of the first charge thereto and the supply of the second charge thereto, the die 19 being of greater diameter than the core tablet so that powder from the second charge can form a coat of the desired thickness round the edge of the tablet.

To introduce the core tablet ejected by the punch 8 into the die 19 there is the hereinafter described transfer mechanism:

A bridge piece 27 and a bridge piece 28 are arranged stationarily between the tables 2 and 12 so as to form tracks which are continuations of the upper surfaces of the two tables. A spindle 29 is arranged between the tables and is rotated by a suitable driving mechanism synchronously with the tables 2 and 12. A plate 30 rotates with the spindle and has a plurality of arms 31 mounted on it by means of pivot pins 32 whereby each arm is free to swing on the plate independently of the other arms. Each arm 31 has a bracket 33 mounted slidably on it by means of a rod 34 slidably mounted in a longitudinal hole in the arm 31. The rod is urged outwards by a compression spring 35 in the said hole but the extent to which the bracket can be displaced outwards by the spring is limited by means of a stop 36 provided on the bracket and co-operating with an abutment pin 37 provided on the arm 31. The stop 36 also co-operates with the side of the arm 31 to limit rotation of the bracket 33 about the axis of the rod 34.

Although the arm 31 and therefore the bracket 33 are free to swing on the pivot 32, the swinging motion is controlled by a spring rod 38 fixed at 39 to the plate 30 and slidable in a hole 40 in the bracket 33, the said spring rod acting to yieldingly retain the arm and bracket in a normal position and to return the said arm and bracket to the normal position after being swung out of the same. The bracket has a fork 41 for engagement by a perforate boss 42 provided on the head 16 concentric with the axis of the respective punch 17 projecting therethrough. As the parts rotate, the fork of each bracket 33 moves into engagement with one of the bosses 42 and the movement of the bracket is thereafter controlled by the boss until the fork again moves out of engagement. The said bracket is therefore brought positively into phase with the punch 17 and constrained to follow the path of the punch 17 for a part of its revolution. Because the table 12 and head 16 are in fixed relationship to one another, the boss 42 is in fixed relationship to the die 19. Because the bracket 33 is brought into exact phase with the boss 42 it is also brought into exact phase with the die 19 for a sufficiently long period to enable a core tablet 4 to be deposited and settled in the die 19. For the purpose of depositing a core tablet, each bracket is provided with a sleeve 43 slidable up and down in the bracket 33 and having an external diameter at its lower end which enables it to form a sliding fit in the die 19, the internal diameter being such that the core tablet is a sliding fit therein. The sleeve has a pin 44 fixed to it and slidable up and down in a slot 45 in the bracket 33, the pin projecting beyond the bracket so that it can be acted on by the cam 26. In the sleeve there is a slidable weight 46 having a slot 47 which accommodates the pin 44 while allowing a predetermined amount of upward and downward movement of the weight independently of the pin and therefore of the sleeve 43.

The head 6 is also provided with perforate bosses 48 concentric with the punches 7 projecting therethrough and adapted by engagement with the forks 41 to positively make the bracket 33 come into phase with the die 3 and move in phase with the said die and follow the path of the said die for a period during the engagement of the fork with the collar. Each bracket 33 therefore follows the path indicated in Figure 2 by a dot-and-dash line 49 and it will be noticed that this path is changed from a circular path by the co-operation of the bosses 42 and 48 with the forks 41, the slidability of the rods 34 permitting this deviation. Furthermore because the arms can swing independently on their pivots 32 each arm can be moved out of its normal position by the boss engaged therewith if an irregularity in the spacing of the dies or some other similar irregularity demands a deviation of the bracket and arm from its normal state in order to enable the co-operation of the bosses with the forks to ensure exact registration and phasing of the sleeves with the dies for periods sufficiently long to enable the core tablets to be placed and settled centrally and on a level keel in the dies 19.

During the period that each bracket 33 moves in phase with a die 3, the respective punch 8 ejects a core tablet into the respective sleeve 43. The ejected tablet is slid along the table 2, the bridge 28 and the table 12 until it arrives above a die 19, by which time the corresponding boss 42 has taken charge of the bracket 33 and thereby ensured correct registration and phasing of the movements of the die 19 and the sleeve 43. The sleeve is kept in its raised position by sliding on the said surfaces and comes under the action of the cam 26, see Figures 1, 2 and 5, so that the pin rides on the surface of the cam, which surface has a fall 50, see Figure 5, which allows the pin and therefore the sleeve to sink during the period that it is moving in exact register and along the same path as the die. The sleeve therefore sinks with its lower end into the die at the same time that the tablet contained in the sleeve sinks into the die on to a previously inserted bed 52 of powder, aided by the weight 46 pressing by gravity on the tablet. The tablet is therefore controlled by the sleeve laterally until it has reached the bed 52 and is therefore positively located exactly centrally in the die whereby a uniform coating around its edge is ensured. Furthermore the weight pressing on the tablet counteracts any deviation of the tablet from an even keel, that is to say any deviation of the same from a horizontal position and thereby ensures that the bed 52 beneath the tablet shall be uniform and also that the covering above the tablet subsequently applied shall also be uniform. While the boss 41 is still dictating the path of the bracket 33 a rise 51 of the cam 26 causes the pin 44 to rise and at the same time causes the sleeve 43 to rise until it is clear of the die 19. However, due to the slot 47, the weight 46 is not lifted out of the die until the sleeve has become disengaged from the tablet and the weight therefore operates to prevent the tablet from being lifted out of the die by the rising sleeve. However the pin after reaching the upper end of the slot 47 also lifts the weight clear of the die and the sleeve and weight are then in the position shown in Figure 3. After the pin 44 has left the cam 26, the sleeve and weight ride on the surface of the tables 2 and 12, and the bridge 27 as shown in Figure 4. As the newly formed core tablet is ejected by the respective punch 8 it pushes only the weight up into a higher position, which is permitted by the slot 47, and then only the sleeve and tablet slide on the tables 2 and 12 and the bridge 28.

The bed 52 or powder on to which the core tablet is fed is produced by powder falling from the hopper 24 into the die while the upper end of the punch is a distance below the orifice of the die and before the die meets the sleeve 43. After the die 19 has left the hopper 24, the punch 14 is lowered so that its upper end is a greater distance from the orifice of the die and there is therefore accommodation ready for the core tablet 4 before it is fed to the die. After the tablet has been fed into the die and the sleeve and weight have been raised clear and have passed from the vicinity of the die, the punch 14 is lowered still further to cause its upper end to sink to a still greater distance below the die orifice so that the bed 52 and tablet 4 sink therein sufficiently to leave room for the covering powder, whereupon covering powder falls from the hopper 25 into the die to fill the uiform space left by the sleeve around the edge of the tablet and provide a uniform coating above the tablet. Thereafter the punch 17 is forced downwards with the requisite pressure in order to compress the bed and upper coating so as to form a complete coat around the core tablet.

The punch 17 is thereupon again raised into the position shown in Figure 1 clear of other parts and the punch 14 is thrust upwards to eject the coated tablet from the die, the coated tablet being thereupon guided to the edge of the table by a stationary guide strip 53 combined with the hopper 24. Figure 4 shows the sleeve, core tablet and weight when fully engaged with the die 19. To enable the sleeve to bed more readily on the bed 52 of powder already contained in the die, its lower edge may be provided with notches 54 as indicated in Figure 3.

Figure 7:
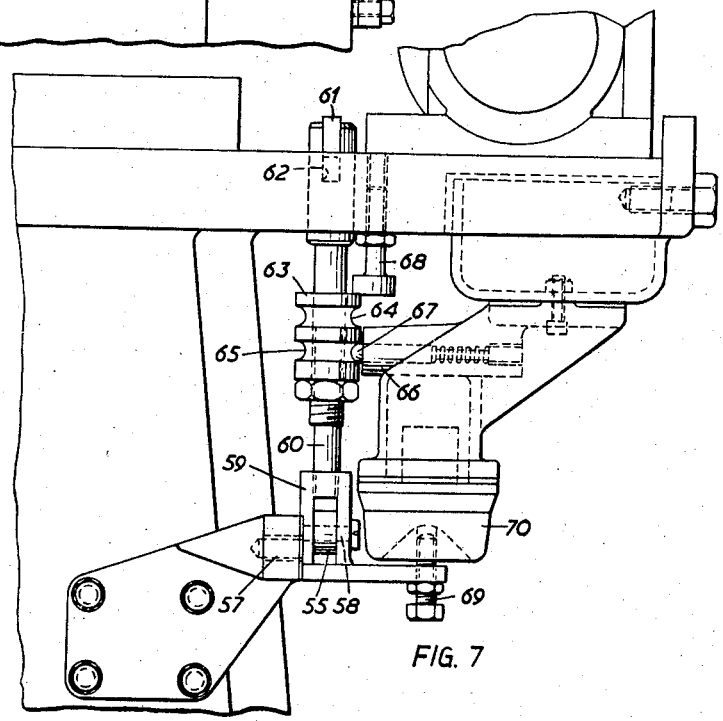
Figure 7 is an end view thereof.

Mechanism is also preferably provided for enabling a sampling check to be made when desired on the core tablets produced by the said tablet making mechanism without stopping the machine. One construction of mechanism shown more particularly in Figures 6, 7, 8 and 9 consists of an operating lever 55 having a handle 56 and pivoted at 57 to the stationary base 1 of the machine. The operating lever 55 has its non-handle end pivoted at 58 to one arm of a bracket 59 which is mounted on the lower end of a rod 60 slidable in the stationary base 1. The upper end of the rod 60 is provided with a portion 61 which is slidable in a slot 62 in the groove of the cam 23, the portion 61 when projected from the slot 62 serving as an auxiliary cam. The rod 60 is furthermore provided with a collar 63 which can be adjusted in various positions along the rod as desired, the collar 63 being provided with two grooves 64, 65 respectively. Mounted on a part associated with the stationary base 1 is a member 66 having a spring loaded ball catch 67 adapted to engage with one or the other of the grooves 64, 65 in order to hold the rod 60 in either of two axial positions. An adjustable stop 68 is provided to limit the axial movement of the rod 60 in one direction.

The other arm of the bracket 59 is provided with an adjustable contact pin 69 adapted in one axial position of the rod 60 to engage with and close a spring loaded electric switch 70 and in the other axial position of the rod 60 to be disengaged from the switch 70 and thereby allow the switch 70 to open. The switch controls the supply of electric current to a solenoid 71 which when energised causes movement of a member 72 having one end of a chain 73 pivoted to it, the chain passing round a sprocket wheel 74 and its other end connected to a spring 75 anchored to a stationary part of the machine. The sprocket wheel 74 is fixed non-rotatably to a spindle 76 journalled in stationary bearings and coupled to a flexible shaft 77 which in turn is coupled to the pivot of a deflector plate 78. The deflector plate can occupy either of two angular positions, one in which it opens a chute 79 and closes another chute 80, and the other in which it closes the chute 79 and opens the chute 80.

In operation, when it is desired to obtain samples of the core tablets produced by the core tablet making mechanism without stopping the machine, the operating lever 55 is moved into the position in which it causes projection of the auxiliary cam formed by the portion 61 into the groove of the cam 23. This causes the next coating punch 14 which encounters the portion 61 to be lifted to an extent whereby its tip is flush with the surface of the table 12, whereby the core tablet 4 and bed of powder 52 contained in the die 19 are lifted above the surface of the table 12. A scraper blade 81 (see Figures 1B and 2B) deflects the core tablet 4 to the edge of the table 12 and scrapes the bed of powder 52 from the tip of the punch 14 but allows the powder to pass beneath the blade and travel with the table until it falls into and is collected by the hopper 24. The core tablet 4 travels with the table 12 near its outside edge and is deflected by the stationary guide strip 53 into the take-off chute having branches 79 and 80. Movement of the operating lever 55 has already moved the deflector plate 78 through the medium of switch 70, solenoid 71, chain 73, spindle 76 and flexible shaft 77, into the position in which branch chute 80 is open and branch chute 79 is closed. Core tablets for sampling therefore pass down chute 80 and can be collected.

When it is desired to discontinue sampling and revert to normal production of coated tablets, the operating lever is moved into its alternative position which removes the portion 61 from projection into the groove of the cam 23. Furthermore, the contact pin 69 is removed from contact with the switch 70. The switch 70 is provided with a time-delay device which prevents it from closing for a period during which core tablets already removed from their dies 19 are caused to pass down chute 80 for collection. On closure of the switch after the said delay, the solenoid 71 is de-energised and the spring 75 causes rotation of the sprocket wheel 74 and consequent movement of the deflector plate 78 so as to close the chute 80 and open the chute 79, down which the coated core tablets pass and can be collected separately from the uncoated core tablets which have passed down the chute 80.

I claim:

1. A machine for coating core tablets comprising, continuously rotating coating means including a coating die for the coating of the core tablets, continuously rotating transfer means for moving the core tablets to said coating means, said transfer means being in continued coincidence with said coating die, controlling means on said coating means for positive engagement with said transfer means over a restricted period for bringing and maintaining the core tablets centrally of said coating die for the period while the core tablets are moving from said transfer means to said coating die.

2. A machine for coating core tablets comprising, continuously rotating core tablet making means including a coating die for producing a core tablet, a continuously rotating coating means for coating the core tablet, a continuously rotating transfer means for moving the core tablet from said tablet making means to said coating means, said transfer means being in continued coincidence with said coating die, controlling means on said coating means for positive engagement with said transfer means through a restricted period of time for bringing and maintaining the core tablet centrally of said coating die for the period while the core tablet is moved from said transfer means to said coating die.

3. A machine for coating a core tablet comprising, continuously rotating coating means for the coating of the core tablet including a plurality of coating dies, continuously rotating transfer means for moving the core tablet to said coating means, controlling means on said coating means for positively engaging said transfer means for a cycle of time while the core tablet sinks from said transfer means into its correct location in one of the coating dies of said coating means, said transfer means maintaining a correct position relative to said coating means during the time cycle, and control means positively engaging said transfer means for a limited cycle of time while the core tablet rises into its correct position in said transfer means, and means for idling said transfer means during the limited time cycle.

4. The machine of claim 3 including, continuous rotary core tablet making means for producing the core tablet.

5. In a core tablet machine including a continuously moving coating means for coating the core tablet, the improvement comprising, a plurality of coating dies, a continuously circulating transfer means for transferring a core tablet to the coating means and including a contractile transfer arm, a rotatable support on said transfer means for resiliently holding the transfer arm thereof angularly displaceable thereto, a control surface rotatable with said coating dies and in positive engagement with the transfer arm of said transfer means during a limited time cycle for centering and maintaining the core tablet centrally of one of the dies of said plurality thereof for the cycle of time during which the core tablet is lowered from the transfer arm of said transfer means into a correct position in the said one die.

6. In the core tablet machine of claim 5 including, a continuously rotating core tablet making means for producing the core tablet.

7. In a machine for coating a tablet, an organization of coactive elements for the purpose described, the same comprising, continuously rotary coating means for coating the core tablet and including at least one coating die, continuously circulating transfer means for transferring the core tablet to said coating means and including a two-part transfer arm, a rotatable support, a pivotal connection for connecting one of the parts of the transfer arm of said transfer means to said support, resilient means for holding the transfer arm of said transfer means against angular displacement from a radial position on said support, the other of the parts of the transfer arm of said transfer means being slidable on the first named one of the parts of the transfer arm toward said pivotal connection against a spring load and having a tablet-carrying cavity, engagement means provided on and movable with the second named one of the parts of the transfer arm of said transfer means, and a control surface on and rotatable with said coating means and positively engaging said engagement means during a limited time cycle for determining the angular position of the transfer arm and telescoping the first and second named parts thereof during the period of the passage of the core tablet from the tablet-carrying cavity to its final location in the coating die of said coating means.

8. In a machine for coating a tablet, an organization of coactive elements for the purpose described, the same comprising, a continuously rotating core tablet making means, a continuously rotating coating means for coating the core tablet and including at least one coating die, a continuously circulating transfer means for transferring the core tablet from said tablet making means to said coating means and including a two-part transfer arm, a rotatable support, a pivotal connection for connecting one of the parts of the transfer arm of said transfer means to said support, resilient means for holding the transfer arm of said transfer means against angular displacement from a radial position on said support, the other of the parts of the transfer arm of said transfer means being slidable on the first named one of the parts of the transfer arm toward said pivotal connection against a spring load and having a tablet-carrying cavity, engagement means provided on and movable with the second named one of the parts of the transfer arm of said transfer means, and a control surface on and rotatable with said coating means and positively engaging said engagement means during a limited time cycle for determining the angular position of the transfer arm and telescoping the first and second named parts thereof during the period of the passage of the core tablet from the tablet-carrying cavity to its final location in the coating die of said coating means.

9. A machine for the coating of tablet cores comprising, continuously rotating coating means including a coating die for coating the tablet cores, continuously rotating transfer means for transferring the tablet cores to said coating means, a rotatable support fixed to said transfer means, a contractile transfer arm pivoted to said rotatable support, spring means for resiliently retaining said transfer arm in a predetermined angular position relative to said rotatable support, a tubular sleeve on said transfer arm, a weight slidable in said tubular sleeve, said tubular sleeve having a parallel walled cavity for retaining the tablet cores in close sliding fit, means for raising said tubular sleeve and weight for releasing the tablet cores after the tablet cores have been settled by said tubular sleeve and weight in said coating die, engagement means on said transfer arm, and control means provided on said coating means and rotating with said coating die and engageable by said engagement means constraining said tubular sleeve to assume a precise central position relative to said coating die and to maintain same for a time period at least equal to the time taken for one of the tablet cores to pass from its position in the cavity of said tubular sleeve into its position on a bed of coating material in said seating die.

10. A machine according to claim 9 including, lifting means on said weight and tubular sleeve for causing the raising of said weight by said tubular sleeve after said tubular sleeve has started to rise leaving said weight free for pressing on the tablet core during a settling period.

11. A machine for the production of coated tablets and the like comprising, a continuously rotating core tablet making means for producing a core tablet, a continuously rotating coating means including a coating die for the coating of the core tablet, a continuously rotating transfer means for transferring a core tablet from said tablet making means to said coating means, a tubular sleeve of said transfer means, having a parallel walled cavity for containing the core tablet with a close sliding fit, an apertured weight slidable in said sleeve, a pin for projecting from said sleeve and engagement withing the aperture in said weight, the aperture in said weight permitting a degree of idle movement of said pin therewithin for leaving said weight free for descent and for alternatively delaying its descent independently of said sleeve, cam means for operation of said pin and said transfer means, rotating means on said coating means for rotation with said coating die and for engagement with said transfer means over a restricted period and thereby locating the core tablet exactly centrally relative to said coating die for the period of settling of the core tablet in said coating die by said sleeve and weight.

12. A machine for the production of coated tablets and the like comprising, a continuously rotating core tablet making means, a continuously rotating coating means including a coating die, a continuously rotating transfer means for transferring a core tablet from said tablet making means to said coating means, a platform along which said core tablet can be slid by said transfer means in its transfer from said tablet making means to said coating means, engagement means provided on said transfer means, and engagement means provided on said coating means for rotation with said coating die and for centralizing the core tablet with said coating die by engagement with the first named engagement means over a more than momentary instant.

13. A machine for coating a tablet core comprising, a continuously rotating coating means including a coating die for coating the tablet core, a continuously rotating transfer means for transferring a tablet core to said coating means, a tubular sleeve associated with said transfer means, and having a cavity for carrying the tablet core, an apertured weight slidable in said sleeve, a pin projecting from said sleeve and engageable with the aperture in said weight permitting an idling movement of said pin for leaving said weight free to descend and for alternatively delaying its descent independently of said sleeve, cam means effecting operation of said pin and transfer means, and rotating means on said coating means for rotation with said coating die and for engagement with said engagement means on said transfer means over a limited time period and thereby centrally locating the tablet core relative to said coating die for the period of settling of the tablet core in said coating die by said sleeve and weight.

14. A machine for coating core tablets comprising, a continuously rotating coating means including a coating die for coating the tablet core, a continuously rotating transfer means for transferring a tablet core to said coating means, a platform for slidably receiving the tablet core in its transfer from said tablet making means to said coating means, and primary engagement means provided on said transfer means rotated by said coating die for centralizing the tablet core relative to said coating die by engagement with said primary engagement means during a timed interval.

15. A tablet-coating mechanism comprising in combination, a continuously rotating core coating means including a coating die for coating the tablet core, a continuously rotating transfer means for transferring a tablet core to said coating means, a bridge leading to said coating means and providing a platform for sliding movement of the tablet core therealong, a cavitized sleeve connected with said transfer means, an apertured weight slidable in said sleeve, a pin projecting from said sleeve and engageable with the aperture in said weight, the aperture in said weight permitting an idling movement of said pin to free said weight for the descent thereof and alternatively to delaying the descent thereof independently of said sleeve, primary cam means for actuating said pin and sleeve and weight, secondary cam means forming a bridge-like extension of said primary cam means for retaining said sleeve and weight in raised position during the return movement of said transfer means from said coating means, primary engagement means provided on said transfer means, and secondary engagement means provided on said coating means and said primary engagement means for centrally locating the tablet core relative to said coating die during the operative period of said sleeve and weight.

16. A tablet-coating machine comprising, a continuously rotating core coating means including a coating die for coating the tablet core, a continuously rotating transfer means for transferring a tablet core to said coating means, a primary engagement means provided on said transfer means, a secondary engagement means for positively engaging with said primary engagement means and centralizing the tablet core relative to said coating die during the interval while the tablet core is being deposited in said die, and removing means for taking an uncoated tablet core from the machine while in motion.

17. For the coating of a tablet core, a machine according to claim 16, wherein said removing means includes hand controlled means for raising an uncoated tablet core from said coating die, means for moving the raised tablet core from said coating die to a collecting position, and means for collecting the tablet core at the collecting position.

18. A machine for the production of coated tablets and the like comprising, a continuously rotating core tablet making means for producing a core tablet, a continuously rotating core coating means including a coating die for coating the core tablet, a continuously rotating transfer means for transferring a core tablet from said tablet making means to said coating means, a bridge between said tablet making means and said coating means for providing a platform along which the core tablet can be slid by said transfer means in its transfer from said tablet making means to said coating means, a cavitized tubular sleeve connected to said transfer means, a weight slidable in said sleeve, a pin for projection from said sleeve and engagement with an aperture in said weight, the aperture in said weight permitting a degree of idle movement of said pin in it for leaving said weight free to descend and for alternatively delaying its descent independently of said sleeve, primary cam means for operation of said pin and sleeve and weight, secondary cam means forming a bridge-like extension of said primary cam means for retaining said sleeve and weight in raised position during the return passage of said transfer means from said coating means to said tablet making means, primary engagement means provided on said transfer means, and secondary engagement means provided on said coating means and engaging said primary engagement means for locating the core tablet centrally relative to said coating die during the operation of said sleeve and weight.

19. A machine for the coating of tablet cores comprising, a continuously rotating coating means including a coating die for coating the tablet core, a continuously rotating transfer means for transferring a tablet core to said coating means, an engagement surface provided on said transfer means for controlling the movement of said transfer means over a restricted period during which the tablet core is transferred to said coating die, hand operated tablet core ejecting means for ejecting a tablet core before coating, said ejecting means including manually displaceable cam means, a punch engaging said coating die and operable by said cam means for raising an uncoated tablet core from said coating die, deflector means for moving a raised tablet core to a discharging position, a chute at the discharging position for receiving and guiding the tablet core from the discharging position, and collecting means associated with said chute for collecting a tablet core leaving said chute.

20. A machine according to claim 19, wherein said chute comprises a sampling branch and a collecting branch, a manually controlled guide means for guiding an uncoated tablet core into the sampling branch of said chute for inspection and for guiding a coated tablet core into the collecting branch of said chute for collection.

21. A machine for the production of coated tablets, comprising, a continuously rotating core tablet making means for producing a core tablet, a continuous rotating core coating means including a coating die for coating the core tablet, a continuously rotating transfer means for transferring a core tablet from said tablet making means to said coating means, primary engagement means provided on said transfer means, secondary engagement means provided on said tablet making means for positively engaging with said primary engagement means and centralizing the core tablet relative to said coating die for the period taken in depositing the core tablet in said coating die, and removing means for taking an uncoated core tablet from the machine while in motion.

22. In a machine for the coating of tablet cores comprising a core tablet ejecting means for ejecting a core at will before coating and including shiftable cam means, a coating die for holding a tablet core, a punch slidable in said coating die by the cam means for ejecting a tablet core therefrom, deflector means for moving an ejected tablet core to a collecting position, an entrance chute into which the ejected tablet core may be guided by said deflector means, a sampling branch chute extending from said entrance chute, a collecting branch chute extending from said entrance chute, a tablet core collecting receptacle at the delivery end of said sampling branch chute, a coated tablet collecting receptacle at the delivery end of said collecting branch chute, a shiftable guide member at the junction of said sampling and collecting branch chutes and said entrance chute for selectively guiding a tablet into said sampling branch chute or said collecting branch chute, manually operable control means operatively connected to the cam means of said ejecting means and said guide member for shifting the cam means into operative position and said guide member into its position for guiding a tablet into said sampling branch chute, and delaying means operatively connected to said shiftable guide member for delaying the shifting of said guide member from the guiding position after the cam means ceases operation.

23. A machine for the coating of tablets comprising a continuously rotating coating means including a coating die for coating the tablet, a continuously rotating transfer means for transferring tablet to said coating means, a rotatable support fixed to said transfer means, a transfer arm having a primary and a secondary part, a pivotal connection for connection of the primary part of said transfer arm to said rotatable support, the secondary part of said transfer arm being slidable on the primary part thereof towards said pivotal connection against spring load, a spring rod mountable at one end on said rotatable support and slidable longitudinally in an aperture in the secondary part, of said transfer arm, a stop pin on the primary part of said transfer arm, a shouldered projecting portion on the secondary part of said transfer arm, said stop pin and the shoulder of said projecting portion cooperating for limiting the degree of movement of the secondary part of said transfer arm away from the primary part thereof under spring load, a tubular sleeve fixed to the secondary part of said transfer arm, a weight slidable in said sleeve, said sleeve having a cavity for containing the tablet, a pin for projection from said sleeve and engagement with an aperture in said weight, the aperture in said weight permitting an idling movement of said pin therewithin for leaving said weight free to descend and for alternatively delaying the descent of said weight independently of said sleeve, cam means for operating said pin and sleeve and weight, secondary cam means for forming a bridge-like extension of said cam means for retaining said sleeve and weight in raised position during the return passage of said transfer arm, a fork on the secondary part of said transfer arm, a boss provided on said coating means and rotating with said die for registration and control by said fork during a period occupied in the passage of a tablet from said transfer means into its position in said coating die, and a bridge disposed adjacent said coating means for supporting a tablet while being transferred to said coating means.

24. A machine for the uniform coating of a plurality of formed core tablets comprising, a coating mechanism including a plurality of dies, means for transferring and locating each of a plurality of formed core tablets to each of the plurality of dies of said coating mechanism, said coating mechanism and transfer means being each continuously circulatable in a manner whereby each of the formed core tablets is successively located by said transfer means centrally of its related die of said coating mechanism for transfer thereto and retention thereby with the formed core tablets following a path in a superimposed manner substantially similar to the path followed by the dies of said coating mechanism for a time interval sufficient to enable the formed core tablets successively to become free of restraint imposed by said transfer means.

25. A machine for the production of coated tablets and the like comprising, continuous rotary core tablet making means for producing a core tablet, continuous rotary tablet coating means including a coating die for coating the core tablet, continuously rotating transfer means for transferring a core tablet from said tablet making means to said tablet coating means, a rotatable support for said transfer means, a contractile transfer arm pivoted to said rotatable support, spring means for retaining said transfer arm resiliently in a predetermined angular position relative to said rotatable support, a tubular sleeve on said transfer arm, and having a parallel walled cavity for containing the core tablet with a close sliding fit, a weight slidable in said sleeve, means for raising said sleeve and weight for releasing the core tablet after the core tablet has been settled by said sleeve and weight in said coating die, engagement means on said transfer arm, and control means provided on said tablet coating means and rotatable with said coating die and engageable by said engagement means constraining said sleeve to assume and maintain a central position relative to said coating die for a period at least equal to the time taken for a core tablet to pass from its position in the cavity in said sleeve into its position on a bed of coating material in said coating die.

26. A machine for the uniform coating of a formed core tablet comprising, a coating mechanism including a die, means for transferring and locating a formed core tablet into the die of said coating mechanism, said coating mechanism and transfer being in continued coincidence with each other and being each continuously circulatable in a manner whereby the formed core tablet is successively located by said transfer means centrally of the die of said coating mechanism for transfer thereto and retention thereby, with the formed core tablet following a path in a superimposed manner substantially similar to the path followed by the die of said coating mechanism for a time interval sufficient to enable the formed core tablet to become free of restraint imposed by said transfer means.

References Cited in the file of this patent

UNITED STATES PATENTS

| | | |
|---|---|---|
| 568,488 | Noyes | Sept. 29, 1896 |
| 582,794 | Noyes | May 18, 1897 |
| 1,248,571 | Stokes | Dec. 4, 1917 |
| 2,700,938 | Wolff et al. | Feb. 1, 1955 |
| 2,727,473 | Wolff | Dec. 20, 1955 |